(12) United States Patent
Goodson, II et al.

(10) Patent No.: US 11,532,981 B2
(45) Date of Patent: Dec. 20, 2022

(54) AUTOMATIC ADJUSTMENT OF POWER SUPPLY VOLTAGE TO MAINTAIN VOLTAGE DURING TRANSIENTS

(71) Applicant: HEWLETT PACKARD ENTERPRISE DEVELOPMENT LP, Houston, TX (US)

(72) Inventors: Stewart Gavin Goodson, II, Houston, TX (US); Daniel Humphrey, Houston, TX (US); Robin Kel Schrader, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/326,670

(22) Filed: May 21, 2021

(65) Prior Publication Data

US 2022/0376608 A1    Nov. 24, 2022

(51) Int. Cl.
*H02M 1/32* (2007.01)
*H02M 3/04* (2006.01)

(52) U.S. Cl.
CPC .............. *H02M 1/32* (2013.01); *H02M 3/04* (2013.01)

(58) Field of Classification Search
None
See application file for complete search history.

(56) References Cited

U.S. PATENT DOCUMENTS

| 3,600,598 A | 8/1971 | Foerster |
| 4,001,665 A | 1/1977 | Wisner et al. |
| 7,187,157 B1 | 3/2007 | Dix |
| 8,483,633 B2 | 7/2013 | Murji |
| 8,836,163 B2 | 9/2014 | Li et al. |
| 9,350,281 B2 | 5/2016 | Rodiguez |
| 10,326,302 B2* | 6/2019 | Humphrey ............... H02J 9/00 |

OTHER PUBLICATIONS

Kadyrov, I. et al., "Automatic Voltage Regulation System Construction for Synchronous Generator of a Small Hydro Power Plant Using Thyristor Pathogens," E3S Web of Conferences.

* cited by examiner

*Primary Examiner* — Jeffery S Zweizig
(74) *Attorney, Agent, or Firm* — Nolte Lackenbach Siegel (57) ABSTRACT

A power supply system includes a plurality of power supplies coupled to a common power bus. Each of the plurality of power supplies adjusts an output voltage set-point within a droop window in response to an excursion sensed voltage on the common power bus reflecting the current load on the power supply system. In response to a transient in the sensed voltage being above or below the droop window, each power supply may shift its droop window up or down. If the droop window of each power supply is at a maximum or minimum value within a voltage regulation window, each power supply may respond to a transient in the sensed voltage by compressing the droop window.

20 Claims, 6 Drawing Sheets

AUTOMATIC ADJUSTMENT OF POWER SUPPLY VOLTAGE TO MAINTAIN VOLTAGE DURING TRANSIENTS

BACKGROUND

Computing systems and computing system datacenters may include power supply systems including multiple power supplies coupled to a common voltage bus to provide power to individual computing system components. Power supply systems may contain multiple power supplies coupled to a common power bus. Current transients may occur on the power bus, particularly where loads may be coupled to a power bus at a significant distance from the power supplies. Current transients may interfere with a power supply system's ability to maintain an output voltage within the regulation limits of the loads.

BRIEF DESCRIPTION OF THE DRAWINGS

The present disclosure is best understood from the following detailed description when read with the accompanying figures, wherein.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Further, as used herein, the term "power conductor" is intended to refer to any one or more conductive elements, such as wires, cables, ribbons, electrical traces, and the like, capable of conducting alternating current ("AC") and/or direct current ("DC") voltages from one point to another.

As used herein, to "provide" an item means to have possession of and/or control over the item. This may include, for example, forming (or assembling) some or all of the item from its constituent materials and/or, obtaining possession of and/or control over an already-formed item.

In computing systems including multiple power supplies coupled to a common power supply bus, current transients can occur on the common supply bus, particularly when some powered compute devices create a current load on the bus a significant physical distance away from the power supplies. Transients can cause issues with the power supplies' ability to maintain the output voltage on the common power supply bus within the voltage regulation limits of the loads coupled to the bus. The capacitance of the common power supply bus and the speed with which the power supplies can self-adjust to compensate for current transients can in extreme cases cause the voltage to drop below the operational limits of the loads, causing the loads to malfunction or shut off.

In some examples herein, in computing systems having power supply systems including multiple power supplies coupled to a common power bus, functionality referred to as "droop sharing" may be implemented. Droop sharing involves each of multiple power supplies dynamically adjusting its output voltage set-point within a "droop window" according to the current load present at any given time. In general, with droop sharing, when a power supply detects an increased current load, such as by sensing a signal from a current sensor on the common power bus, it may decrease its output voltage set-point within a droop window, and when a power supply detects a decreased current load, it may increase its output voltage set-point within the droop window. The size of a droop window relative to an overall voltage regulation window for a power supply may be established by the manufacturer of the power supply.

In some examples, a power supply in a power supply system may increase or decrease its output voltage set-point in a linear relation to the current load. The droop sharing adjustment of output voltage set-points may occur within a "droop window" defined within a voltage regulation window of each power supply. A power supply may dynamically adjust its output voltage set-point within the droop window depending upon a sensed current load on the common bus.

In some examples, the droop window may be shifted up or down within a droop window range (within the voltage regulation window) in response to transients in the detected current load on the common bus. Transients may occur, for example, when system components such as processors, disc drives, and fans are activated or deactivated. Further, the droop window may be a compressed window range when transients occur after the voltage droop window has reached a maximum or minimum relative to the droop window range.

Figure 1:
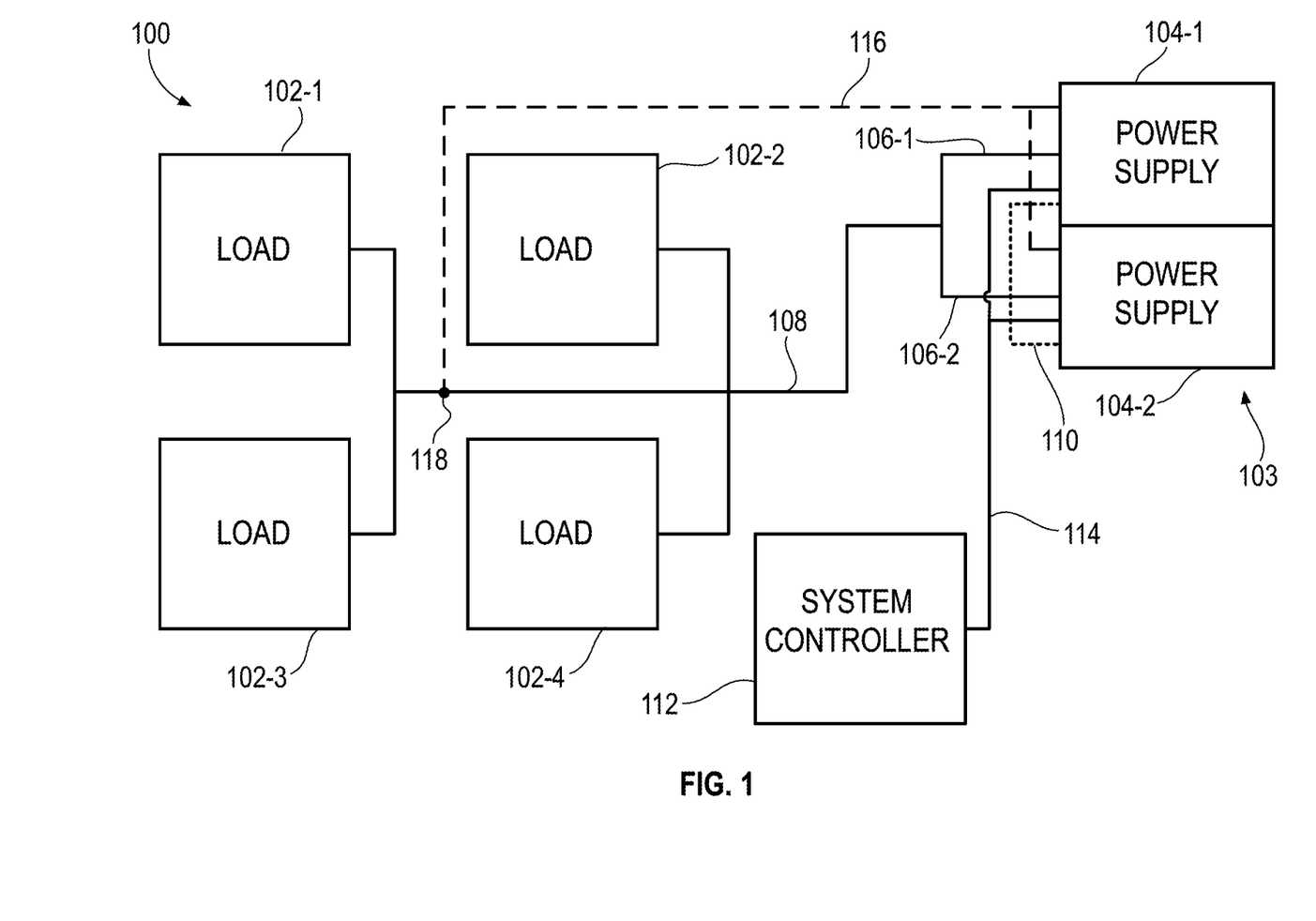
FIG. 1 is a block diagram illustrating a system in accordance with one or more examples.

FIG. 1 is a block diagram illustrating a multiple power supply system 100 according to one or more examples, including a plurality of loads 102-1, 102-2, 102-3, and 102-4 and a power supply system 103 comprising a plurality of power supplies 104-1 and 104-2. An output 106-1 from power supply 104-1 and an output 106-2 from power supply 104-2 are coupled to a common power bus 108 to supply power to loads 102-1, 102-2, 102-3, and 102-4.

Although two power supplies 104-1, 104-2 are shown in the example of FIG. 1, in other examples, power supply system 103 may include additional power supplies. In examples, the plurality of power supplies 104-1, 104-2 are connected by a synchronization signal line 110 for enabling operation of the plurality of power supplies 104-1, 104-2 in power supply system 103 to be synchronized, as herein described. Similarly, some examples not shown may vary the number of loads 102.

As shown in FIG. 1, in some examples, multiple power supply system 100 may include a system controller 112 receiving signals such as a system alert signal via an alert signal line 114 from power supplies 104-1, 104-2. In various examples, system controller 112 may be a programmed processor-based resource that can be a microcontroller or a central processing unit, an application-specific integrated circuit (ASIC) or an electrically-erasable programmable read-only memory (EEPROM) for performing functionality as described herein. Any of the plurality of power supplies 104-1, 104-2 may alert system controller 112 in the event that a power supply operating limit is exceeded, as herein described.

In some examples, power supplies 104-1 and 104-2 may sense a voltage at a first location at or proximal to their respective outputs 106-1 and 106-2 which reflects a current load on common power bus 108. As further shown in FIG. 1, in some examples a remote voltage sensing line 116 may be coupled to a remote sensing point 118 at a second location on common power bus 108 and provides a remote voltage sensing signal to the plurality of power supplies 104-1, 104-2. In some examples, remote sensing point 118 may be in a second location that is physically distant from power supplies 104-1, 104-2, and in better proximity to loads 102-1-102-4 than to the first location at the outputs 106-1 and 106-2 of power supplies 104-1 and 104-2, in order for remote voltage sensing signal on remote sensing line 116 to reflect voltages that might differ from voltages directly at the respective outputs 106-1 and 106-2 of power supplies 104-1, 104-2 due to capacitive, inductive, and/or resistive effects of current conducted along the length of common power bus 108, as well as localized capacitive, inductive, and/or resistive behaviors of power supplies 104-1 and 104-2, individual loads such as loads 102-1-102-4, and common power bus 108 itself.

Figure 2:
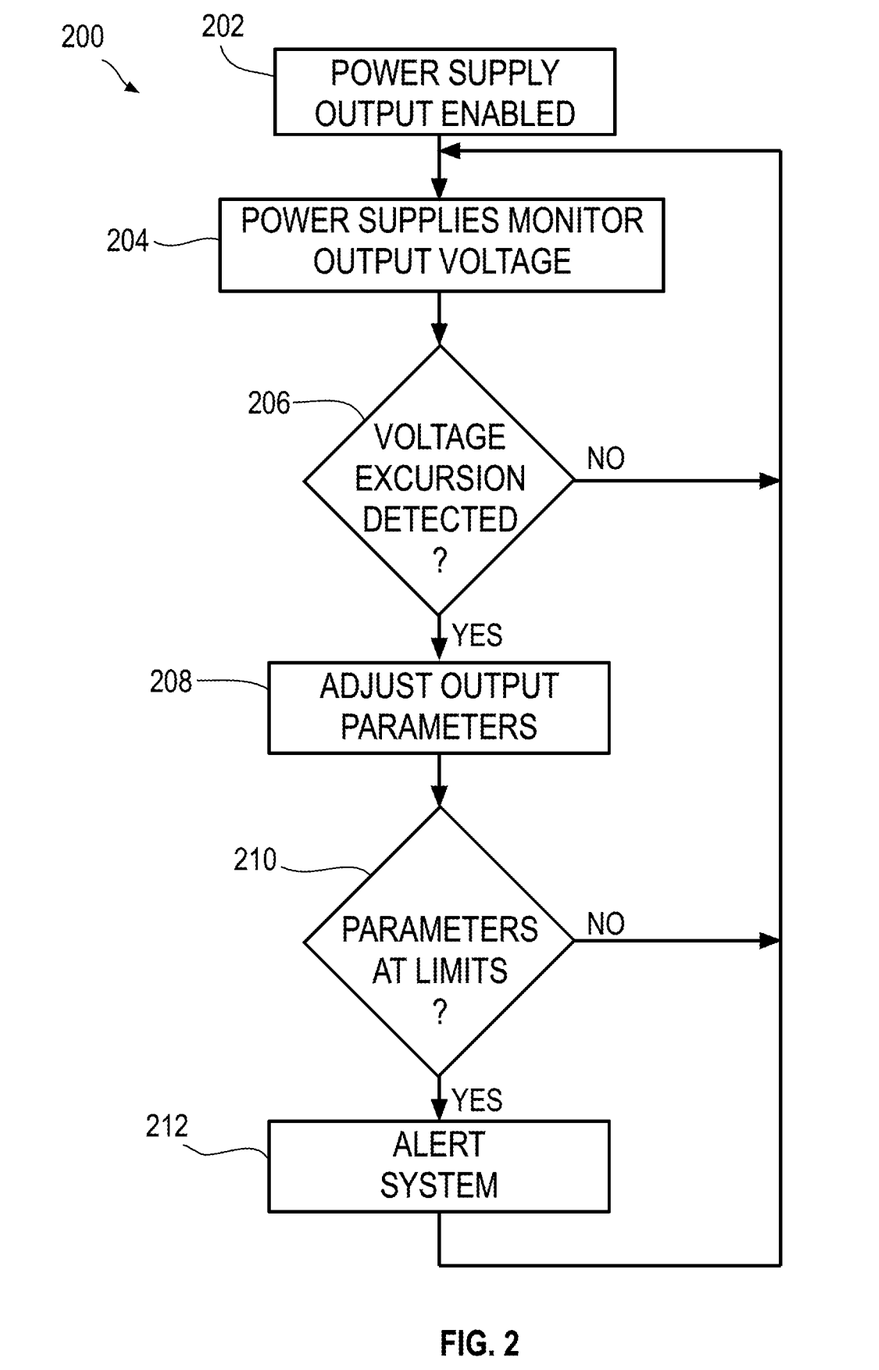
FIG. 2 is a flow diagram illustrating operation of a power supply system according to one or more examples.

FIG. 2 is a flow diagram of a method 200 according to one or more examples of operating multiple power supply system 100 from FIG. 1. The method of FIG. 2 may be performed continuously by each power supply 104-1 and 104-2 in multiple power supply system 100, and results in adjustment of an output voltage set-point for each power supply 104-1 and 104-2 in response to excursions in voltage on common power bus 108. Any excursion of voltage on common power bus 108 is indicative of a change in the overall load on common power bus 108 which in some examples may result in power supply operation as herein described. Such excursions may be sensed at the output of each power supply 104-1 and 104-2, and may further be sensed at remote sensing point 118, which may be at a location more distant from power supplies 104-1 and 104-2 and in closer proximity to one or more of loads 102-1-102-4.

First in method 200, the plurality of power supplies 104-1 and 104-2 are enabled, as represented by block 202 in FIG. 2. Next, in block 204, power supplies 104-1 and 104-2 monitor the output voltage on common power bus 108. In examples, such monitoring may involve each power supply 104-1 and 104-2 monitoring the voltage on common power bus 108 at their respective outputs 106-1 and 106-2, and further may involve monitoring the voltage on common power bus 108 at remote sensing point 118 at a different location on common power bus 108, as described with reference to FIG. 1.

In block 206 of FIG. 2, each power supply 104-1 and 104-2 determines whether a voltage excursion on common power bus 108 is detected during the monitoring of block 204. If no excursion is detected, monitoring continues in block 204. However, if an excursion is detected in block 206, one or more of the plurality of power supplies 104-1 and 104-2 may adjust output parameters, as herein described, and as represented by block 208, to compensate for the excursion. In examples, output parameter adjustment in block 208 may involve the adjustment of an output voltage set-point for each of the plurality of power supplies 104-1 and 104-2 based on the sensed excursion. Further, in examples, adjustment of output parameters in block 208 may be synchronized among the plurality of power supplies 104-1 and 104-2 by communication over synchronization signal line 110.

In block 210, a determination is made whether the sensed excursion in block 204 is a transient that would require the set-point of the power supplies to be adjusted outside of the currently-defined "droop window" (described below) for each power supply 104-1 and 104-2, In that case, then in block 212, an alert may be sent to system controller 112 via alert signal line 114. System controller 112 may then respond, in one or more examples, by causing power supplies 104-1 and 104-2 to adjust their droop windows, as described herein with reference to FIG. 3 and FIGS. 4A-4E.

Figure 3:
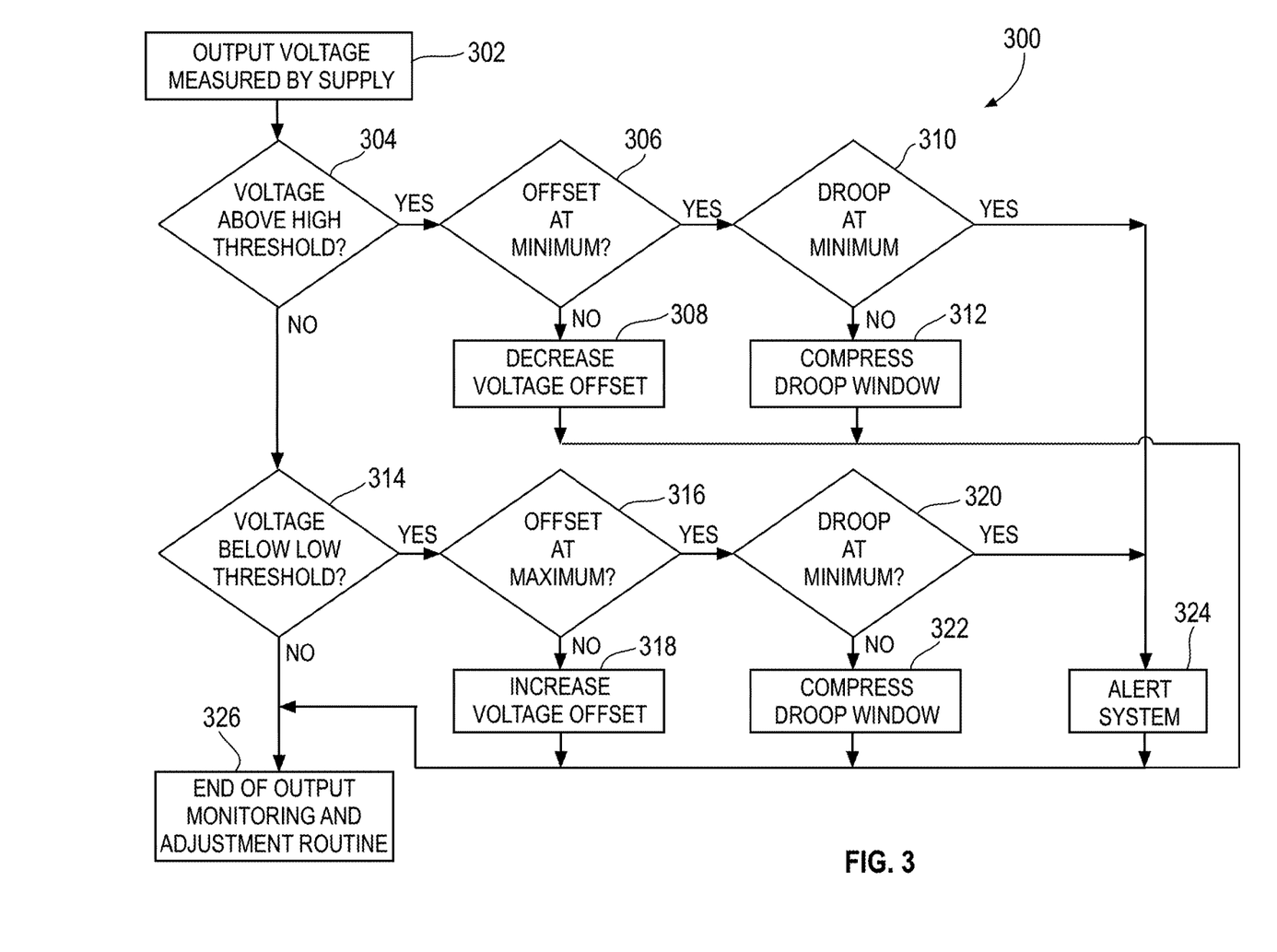
FIG. 3 is a flow diagram illustrating power supply output monitoring and adjustment routine according to one or more examples.

FIG. 3 is a flow diagram of an output monitoring and adjustment routine 300 for operating power supplies such as power supplies 104-1 and 104-2 in a system such as multiple power supply system 100 including a plurality of power supplies. First in routine 300, a power supply measures an output voltage, as shown in block 302. In the example of FIG. 1, power supplies 104-1 and 104-2 may measure the voltage at their respective outputs 106-1 and 106-2. In some examples, power supplies 104-2 and 104-2 may also, or instead, measure an output voltage at remote sensing point 118 on common power bus 108 via remote sensing line 116. As previously described, remote sensing point 118 may be physically distant from the outputs of power supplies 104-1 and 104-2, such that the sensed voltage at remote voltage point 118 may be affected by capacitive and inductive effects introduced as current is conducted along the length of common system bus 108, as well as by capacitances of loads 102-1-102-4.

With continued reference to FIG. 3, in block 304 a determination is made whether the voltage sensed in block 302 is above a predetermined high threshold. In particular, for each power supply 104-1 and 104-2, a "transient threshold window" may be defined for each power supply 104-1 and 104-2. Normally, as noted above, in response to a sensed excursion, each power supply may adjust an output voltage set-point within its droop window. However, for excursions which fall outside of (above or below) the transient threshold window, each power supply 104-1, 104-2 may adjust the position of its droop window within the transient response window. In examples, power supplies 104-1 and 104-2 may synchronize voltage set-point adjustments and droop window adjustments by communicating on synchronizing signal line 110.

Figure 4A:
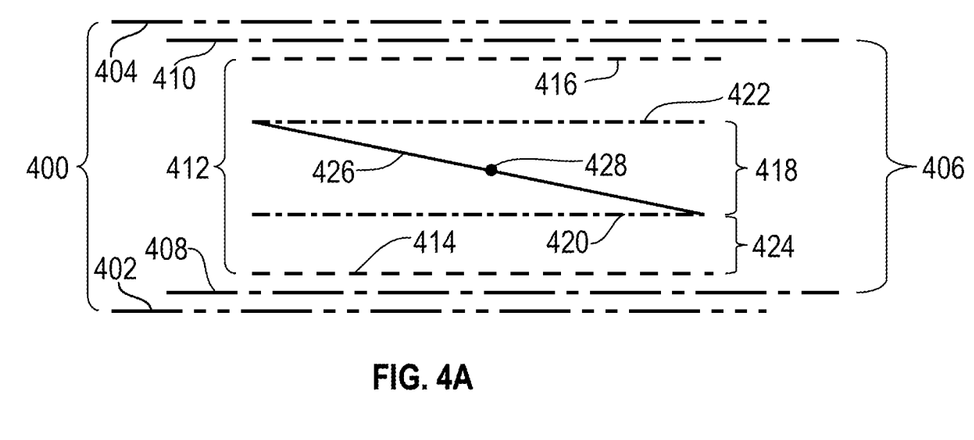
FIGS. 4A-4E are voltage diagrams of voltage set-point ranges within power supply voltage regulation windows according to one or more examples.

FIG. 4A illustrates an output voltage range for power supplies 104-1 and 104-2 according to one or more examples. As shown in FIG. 4A, a voltage regulation window 400 is defined between a lower voltage regulation limit 402 and an upper voltage regulation limit 404. In examples, multiple power supply system 100 may be configured such that if power on common power bus 108 falls outside of voltage regulation window 400, loads 102-1-102-4 may shut down or malfunction, leading to possible data loss or possible damage to loads 102-1-102-4. Voltage regulation window 400 therefore represents a limit on the voltage that must be maintained on common power bus 108 to ensure operation of multiple power supply system 100. In one or more examples, voltage regulation window 400 may range between a lower voltage regulation limit of 11.4V and an upper voltage regulation limit of 12.6V.

As further shown in FIG. 4A, a transient threshold window 406 may be defined within voltage regulation window 400. Transient threshold window 406 may be the same as or smaller than voltage regulation window 400, while falling entirely within voltage regulation window 400. That is, transient threshold window 406 may have a lower transient threshold limit 408 that is equal to or marginally higher than lower voltage regulation limit 402, and may have an upper transient threshold limit 410 equal to or marginally lower than upper voltage regulation limit 404. A transient threshold window 406 that is smaller than voltage regulation window 400 may improve reliability of multiple power supply system 100 by avoiding voltages on common power bus 108 that can reach lower voltage regulation limit 402 or upper voltage regulation limit 404 during intended operation.

With continued reference to FIG. 4A, a droop window range 412 may be defined within transient threshold window 406. Droop window range 412 may extend between a lower droop window range limit 414 and an upper droop window range limit 416. In examples, droop window range 412 represents a range of voltages within which a droop window may be defined for power supplies 104-1, 104-2 in order to perform droop sharing in multiple power supply system 100, as herein described. Droop window range 412 may be the same as or smaller than transient threshold window 406, while falling entirely within transient threshold window 406. That is, lower droop window range limit 414 may be equal to or marginally higher than lower transient threshold limit 408 and upper droop window range limit 416 may be equal to or marginally lower than upper transient threshold limit 410. A droop window range 412 that is smaller than transient threshold window 406 may improve reliability of multiple power supply system 100 by avoiding voltages on common power bus 108 that can reach lower transient threshold limit 408 or upper transient threshold limit 410 during intended operation.

In examples, for each power supply 104-1, 104-2, a droop window 418 is defined within which each power supply 104-2, 104-2 may establish an output voltage set-point along output voltage set-point line 426. Output voltage set-point line 426 establishes the linear relationship between the set-point chosen and a sensed load on common power bus 108. An example set-point output voltage 428 is shown in FIG. 4A. As described herein with reference to FIG. 2, output voltage set-point 428 may be adjusted up or down along output voltage set-point line 426 in response to sensed excursions in voltage on common power bus 108.

As shown in FIG. 4A, droop window 418 may have a lower droop window limit 420 and an upper droop window limit 422. Lower droop window limit 420 represents the output voltage set-point under full load conditions, while upper droop window limit 422 represents the output voltage set-point under no-load conditions. For load conditions between full load and no load, power supplies 104-1, 104-2 may adjust their output voltage set-points along an output voltage set-point line 426 between lower droop window limit 420 (no load) and upper droop window limit 422 (full load). Lower droop window limit 420 is shown in FIG. 4A with an offset 424 from lower droop window range limit 414.

Referring again to FIG. 3, in block 304, if the sensed voltage is determined not to be above upper transient threshold limit 410, then in block 314, a determination is made wither the sensed voltage is below lower transient threshold limit 408, which may be the low end of the transient threshold window 406 for the power supply. If not, routine 300 of FIG. 3 ends, as represented by block 326. In examples, routine 300 may be performed continuously during operation of multiple power supply system 100.

Figure 4B:
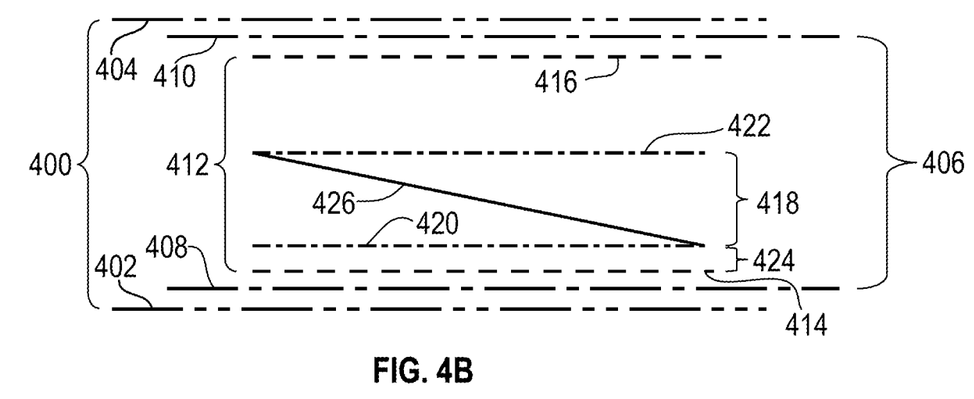

In block 304 of FIG. 3, if the sensed voltage from block 302 is determined to exceed upper transient threshold limit 410, then in block 306, a determination is made whether offset 424 between lower droop window limit 420 and lower droop window range limit 414 is at a minimum. In examples, the minimum of offset 424 is zero, when lower droop window limit 420 is equal to lower droop window range limit 414. If in block 306, it is determined that offset 424 is not at a minimum, then, in block 308, offset 424 is reduced, effectively shifting droop window 418 down within droop window range 412 as shown in FIG. 4B.

Figure 4C:
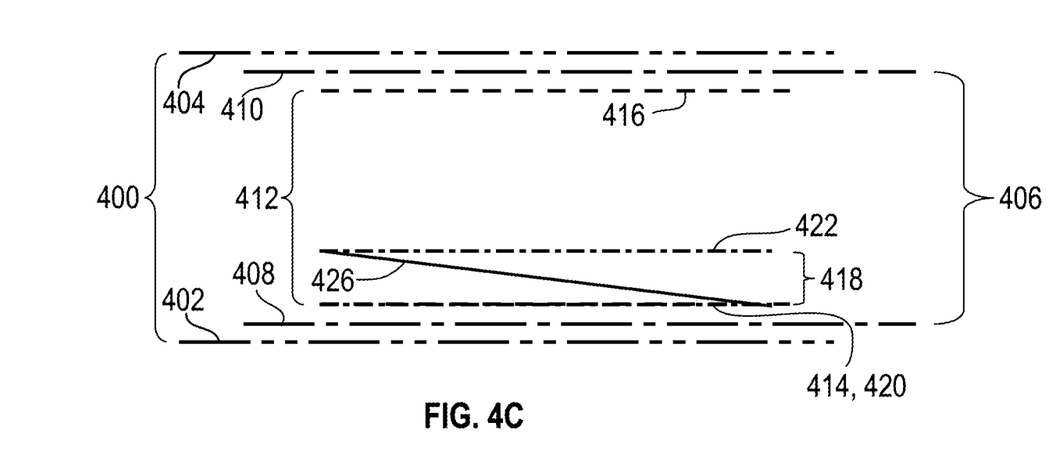

On the other hand, if in block 306 of FIG. 3 it is determined that offset 424 is at a minimum, then in block 310 a determination is made whether the size of droop window 418 is at a minimum. In examples, the minimum size of droop window 418 may be zero, i.e., where upper droop window limit 422 equals lower droop window limit 420. However, if in block 310 it is determined that the size of droop window 418 is not at a minimum, then, droop window 418 may be compressed by lowering upper droop window limit 422 of droop window 418, as represented by block 312 in FIG. 3, and as shown in FIG. 4C.

Figure 4D:
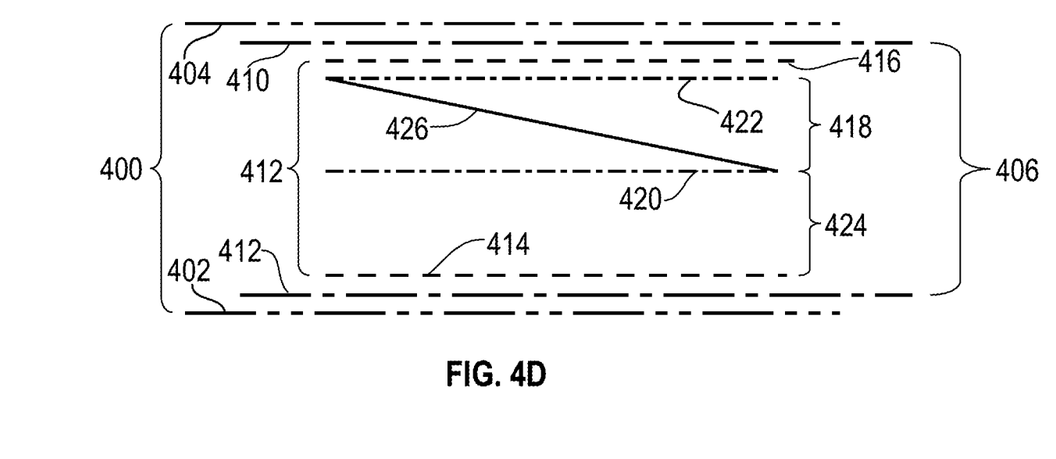

If the voltage sensed in block 302 is determined in block 304 not to exceed upper droop window limit 422 of droop window 418 but is determined in block 314 to be below lower transient threshold limit 408, then, in block 316, a determination is made whether offset 424 is at a maximum. In examples, the maximum size of offset 424 may be reached when upper droop window limit 422 of droop window 418 is equal to upper droop window range limit 416. If offset 424 is not at a maximum in block 316, then offset 424 may be increased, as represented by block 318, and as shown in FIG. 4D, effectively raising droop window 418 within droop window range 412.

Figure 4E:
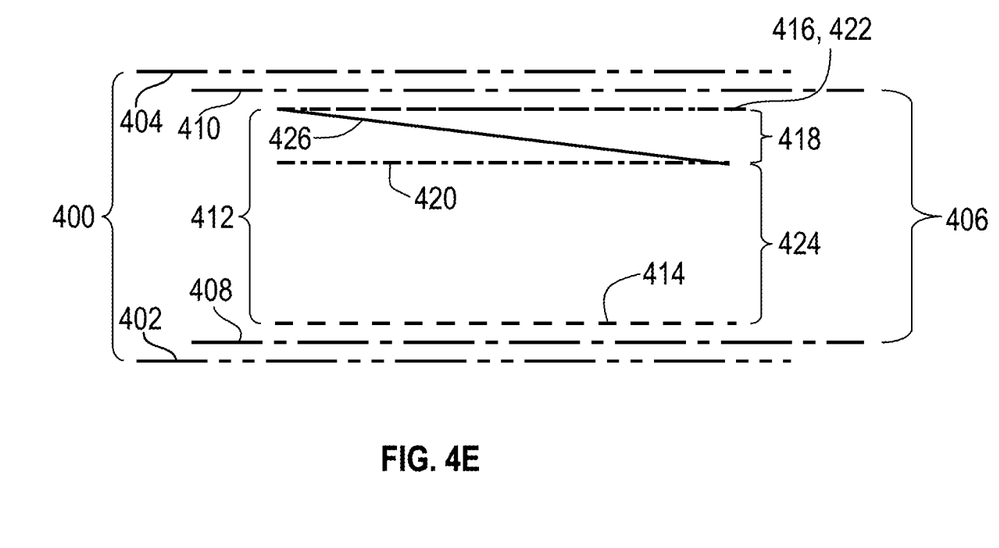

However, if offset 424 is determined to be at a maximum in block 316, then a determination is made, in block 320, whether the magnitude of droop window 418 is at a minimum. If not, then in block 322, droop window 418 is compressed by lower droop window limit 420 of droop window 418, as illustrated in FIG. 4E.

In block 310, if it is determined that the size of droop window 418 is at a minimum, this is an indication that the power supplies 104-1 and 104-2 cannot further adjust to compensate for the sensed transient voltage, necessitating an alert to system controller 112, as represented by block 324 in FIG. 3. Similarly, in block 320, if it is determined that the size of droop window 418 has been compressed to a predetermined minimum size, this is also an indication that the power supplies 104-1 and 104-2 cannot further adjust to compensate for the sensed transient voltage, necessitating an alert to system controller 112 in block 324. In some examples, the predetermined minimum size of droop window may be defined as when upper droop window limit 422 equals lower droop window limit 420, or in some examples the predetermined minimum size of droop window 418 may be some non-zero amount.

By operating according to routine 300 of FIG. 3, power supplies 104-1 and 104-2 may operate to adjust the offsets 424 of their respective droop windows 418 up or down within droop window range 412 depending upon detected transient loads outside of their transient threshold windows 406. When the droop windows of power supplies 104-1 and 104-2 reach maximum or minimum positions within droop window range 412, i.e., when droop window offsets 424 are at a maximum or minimum, further compensation may be achieved by compressing droop windows 418, such as shown in FIGS. 4C and 4E.

The foregoing description, for purposes of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. Examples herein are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method of operating a power supply system, comprising:
    for each of a plurality of power supplies coupled to a common power bus:
        defining a voltage regulation window ranging between an upper voltage regulation limit and a lower voltage regulation limit to be provided on the common power bus;
        defining a transient threshold window having an upper transient threshold limit and a lower transient threshold limit, the upper transient threshold limit being less than or equal to the upper voltage regulation limit and the lower transient threshold limit being greater than or equal to the lower voltage regulation limit;
        defining a droop window in a droop window range having an upper droop window range limit and a lower droop window range limit, the upper droop window range limit being less than or equal to the upper transient threshold limit and the lower droop window range limit being greater than or equal to the lower transient threshold limit, and the droop window having an upper droop window limit and a lower droop window limit;
        sensing at least one voltage on the common bus corresponding to a load on the plurality of power supplies;
        in response to a transient in the sensed at least one voltage exceeding the upper transient threshold limit, reducing an offset between the lower droop window limit and the lower droop window range limit;
        in response to a transient in the sensed at least one voltage below the lower transient threshold limit, increasing the offset between the lower droop window limit and the lower droop window range limit; and
        adjusting an output voltage set-point within the droop window in response to an excursion of the sensed at least one voltage within the droop window.

2. The method of claim 1, further comprising:
    for each of the plurality of power supplies:
        in response to the transient in the sensed at least one voltage exceeding the upper transient threshold limit when the lower droop window limit is equal to the lower droop window range limit, compressing the droop window of each of the plurality of power supplies by lowering the upper limit of the droop window; and
        in response to the transient in the sensed at least one voltage being below the lower transient threshold limit when the upper droop window is equal to the upper droop window range limit, compressing the droop window of each of the plurality of power supplies by raising the lower limit of the droop window.

3. The method of claim 1, wherein the sensing at least one voltage on the common bus comprises sensing a first voltage at a first location on the common bus and a second voltage at a second location on the common bus further distant from the plurality of power supplies than the first location.

4. The method of claim 1, further comprising synchronizing output voltage set-point adjustment by the plurality of power supplies over a synchronization signal line between the plurality of power supplies.

5. The method of claim 1, further comprising:
    in response to the sensed at least one voltage causing the droop window of each of the plurality of power supplies to reach a predetermined minimum size, issuing an alert signal to a system controller via an alert signal line.

6. The method of claim 1, wherein adjusting an output voltage set-point within the droop window in response to an excursion of the sensed at least one voltage within the droop window comprises lowering the output voltage set-point in response to the excursion reflecting an increased current load on the common power bus and raising the output voltage set-point in response to the excursion reflecting a decreased current load on the common power bus.

7. The method of claim 1, wherein the droop window is smaller than the voltage regulation window.

8. A power supply system, comprising:
    a plurality of power supplies each having a power output to provide power to a common power bus;
    wherein:
        each of the plurality of power supplies is responsive to an excursion of a sensed voltage on the common power bus to adjust its output set-point voltage within a droop window having an upper droop window limit and a lower droop window limit, the droop window being defined within a droop window range having an upper droop window range limit and a lower droop window range limit, the droop window having an offset from the lower droop window range limit;
        each of the plurality of power supplies is responsive to an excursion in the sensed voltage exceeding an upper transient threshold limit to reduce the offset of the droop window from the lower droop window range; and the each of the plurality of power supplies is responsive to an excursion in the sensed voltage being below a lower transient threshold limit to increase the offset of the droop window from the lower droop window range.

9. The power supply system of claim 8, wherein:
each of the plurality of power supplies is responsive to the excursion in the sensed voltage exceeding the upper transient threshold limit when the lower droop window limit is equal to the lower droop window range limit to compress the droop window by reducing the upper droop window limit; and
each of the plurality of power supplies is responsive to the excursion in the sensed voltage being below the lower transient threshold limit when the upper droop window limit is equal to the upper droop window range limit to compress the droop window by raising the lower droop window limit.

10. The power supply system of claim 9, further comprising a system controller coupled to each of the plurality of power supplies.

11. The power supply system of claim 10, further comprising a synchronization signal line coupled between each of the plurality of power supplies for synchronizing operation of each of the plurality of power supplies.

12. The power supply system of claim 8, wherein the sensed voltage is provided to the plurality of power supplies by a remote voltage sensing line coupled to the common power bus.

13. The power supply system of claim 8, wherein each of the plurality of power supplies decreases its output voltage set-point within the droop window in response to the excursion of the sensed voltage within the droop window indicating an increased current load on the common power bus and increases its output voltage set-point within the droop window in response to the excursion of the sensed voltage within the droop window indicating a decreased load on the common power bus.

14. The power supply system of claim 8, wherein the droop window is smaller than a voltage regulation window specified for the power supply system.

15. A compute system, comprising:
a plurality of power supplies each having an output coupled to a common power bus;
at least one load coupled to the common power bus;
a remote voltage sensing line for providing a sensed voltage from the common power bus to the plurality of power supplies, the sensed voltage reflecting a current load on the common power bus;

wherein:
each of the plurality of power supplies is responsive to excursions of the sensed voltage to adjust an output set-point voltage within a droop window having an upper droop window limit and a lower droop window limit, the droop window being defined within a droop window range having an upper droop window range limit and a lower droop window range limit, the droop window having an offset from the lower droop window range limit;
each of the plurality of power supplies is responsive to excursions in the sensed voltage exceeding an upper transient threshold limit to reduce the offset between the droop window and the lower droop window range; and
the each of the plurality of power supplies is responsive to excursions in the sensed voltage being below a lower transient threshold limit to increase the offset between the droop window and the lower droop window range.

16. The compute system of claim 15, wherein:
each of the plurality of power supplies is responsive to excursions in the sensed voltage exceeding the upper transient threshold limit when the lower droop window limit is equal to the lower droop window range limit to compress the droop window by reducing the upper droop window limit; and
wherein each of the plurality of power supplies is responsive to transients in the sensed voltage being below the lower transient threshold limit when the upper droop window limit is equal to the upper droop window range limit to compress the droop window by raising the lower droop window limit.

17. The compute system of claim 16, further comprising a synchronization signal line coupled between each of the plurality of power supplies to synchronize operation of the plurality of power supplies.

18. The compute system of claim 16, further comprising a remote voltage sensing line coupled between a remote sensing point on the common power bus and each of the plurality of power supplies.

19. The compute system of claim 16, further comprising a system controller, coupled to the plurality of power supplies.

20. The compute system of claim 15, wherein the droop window is smaller than a voltage regulation window specified for the compute system.

* * * * *